Jan. 6, 1925.

H. GEISENHÖNER 1,522,181

DYNAMO ELECTRIC MACHINE

Filed Sept. 20, 1923

Inventor:
Henry Geisenhöner,
by *[signature]*
His Attorney.

Patented Jan. 6, 1925.

1,522,181

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

DYNAMO-ELECTRIC MACHINE.

Application filed September 20, 1923. Serial No. 663,882.

*To all whom it may concern:*

Be it known that I, HENRY GEISENHÖNER, a citizen of the United States, residing at Schenectady, county of Schenectady, State of New York, have invented certain new and useful Improvements in Dynamo-Electric Machines, of which the following is a specification.

My invention relates to dynamo electric machines and is particularly applicable to such machines having a short circuited winding, and has for its object a novel construction of such a winding which is simple and comparatively cheap to make.

Figure 1:
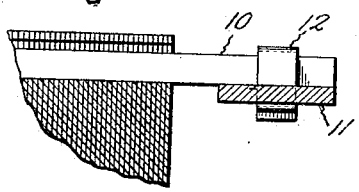
Figure 2:
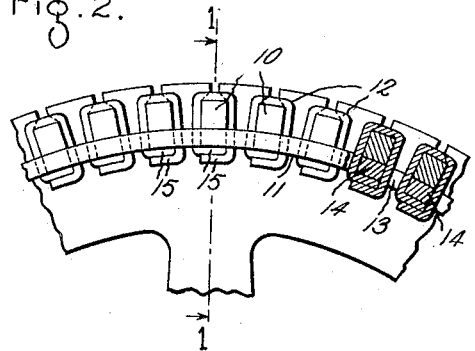
Figure 3:
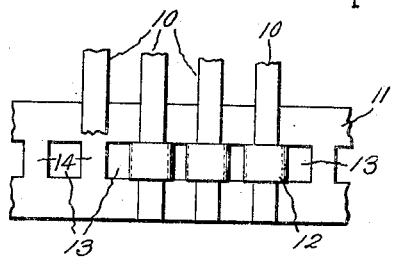

For a better understanding of my invention reference should be had to the following description taken in connection with the accompanying drawing, in which Fig. 1 is a vertical section of a part of a rotor of an induction motor in which I have shown my invention embodied; Fig. 2 is an end elevation partly in section of the same machine; Fig. 3 is a partial plan view of the rotor shown in Fig. 1, and Fig. 4 is a view similar to Fig. 2 showing a modified form of my invention.

In the drawing, the conductors 10 are shown connected to an end ring 11, by means of clips 12 which surround the ends of the conductors 10 and portions of the end ring 11. The end ring 11 is provided with slots 13 through which the clips 12 are inserted. The clips 12 before being applied to the rotor are formed in the shape of a staple or inverted U having their ends open and extending parallel to each other. The end ring 11 is provided with a plurality of slots 13 through which the ends of the clips 12 are inserted. The slots 13 are spaced so as to form webs 14 in the end ring 11. The webs 14 have a width equal to the width of the conductors 10.

In order to fasten the conductors 10 to the end ring 11, the end ring is inserted adjacent the extending ends of the conductors 10 as shown in the drawing and the clips 12 are placed over the conductors 10 with their ends 15 extending through the slots 13 of the end ring. The ends of the clips are then bent over upon each other by any suitable means to form the connection. After the parts are assembled as suggested above they are further secured together by brazing or similar means to form a more perfect union of the parts and thus secure a good electrical connection having a comparatively low resistance. The connections thus formed are mechanically strong and very cheap to make as the time consumed in performing the above operations is very short.

Figure 4:
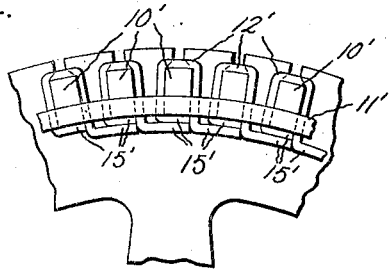

In the modification shown in Fig. 4 conductors 10′ are connected to an end ring 11′ by means of clips 12′, the ends 15′ of which are all bent in the same direction. This modification has some advantages over that previously described in that it provides a greater cross-section of conducting material between the adjacent conductors 10′, and in that the operation of bending the ends of the clips 12′ is simplified by reason of the fact that the ends of the clips 12′ can all be bent in the same direction and the operator will not have to avoid striking the adjacent clip ends as he bends them down.

What I claim as new and desire to secure by Letters Patent of the United States, is,—

1. In a dynamo electric machine, the combination of conductors, an end ring for said conductors, and means passing around said conductors and through said end ring for securing said conductors to said end ring.

2. In a dynamo electric machine, the combination of conductors, an end ring for said conductors, and clips passing through said end ring having their ends bent over upon each other for securing said conductors to said end ring.

3. In a dynamo electric machine the combination of conductors, an end ring for said conductors, and clips passing through slots in said end ring and around the ends of said conductors for securing said conductors and said end ring together.

4. In a dynamo electric machine, a short circuited winding comprising conductors, an end ring for said conductors, said end ring having slots formed therein, clips surrounding the ends of said conductors and passing through the slots in said end ring and means for securing said clips to said conductors and end ring.

5. In a dynamo electric machine the combination of conductors, an end ring for said conductors having slots formed therein, webs between said slots having a width equal to the width of said conductors, clips surrounding said conductors and said webs, and means for securing said clips to said conductors and said webs.

In witness whereof, I have hereunto set my hand this 19th day of September, 1923.

HENRY GEISENHÖNER.